(12) United States Patent
Kawata et al.

(10) Patent No.: US 7,785,385 B2
(45) Date of Patent: Aug. 31, 2010

(54) CERAMIC HONEYCOMB STRUCTURE AND MOLDABLE MATERIAL USABLE FOR ITS EXTRUSION MOLDING

(75) Inventors: Tsunehiro Kawata, Saitama-ken (JP); Osamu Tokudome, Tochigi-ken (JP); Hirohisa Suwabe, Tochigi-ken (JP); Kenichiro Sekiguchi, Tochigi-ken (JP); Hideya Yamane, Tochigi-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 880 days.

(21) Appl. No.: 10/569,443

(22) PCT Filed: Aug. 30, 2004

(86) PCT No.: PCT/JP2004/012505
§ 371 (c)(1),
(2), (4) Date: Sep. 25, 2006

(87) PCT Pub. No.: WO2005/021463
PCT Pub. Date: Mar. 10, 2005

(65) Prior Publication Data
US 2007/0039297 A1 Feb. 22, 2007

(30) Foreign Application Priority Data
Aug. 29, 2003 (JP) .............................. 2003-306260
Nov. 18, 2003 (JP) .............................. 2003-387998
Mar. 16, 2004 (JP) .............................. 2004-073869

(51) Int. Cl.
*B01D 53/02* (2006.01)

(52) U.S. Cl. ..................... 55/523; 55/524; 55/DIG. 5; 264/631; 60/311

(58) Field of Classification Search .................... 55/523, 55/522, 524, 529, 282.2, 282.3, 385.3, DIG. 5, 55/DIG. 10, DIG. 30; 502/439, 417, 527.14; 60/311, 295, 297; 428/116; 422/177, 180; 264/628, 636, 631, DIG. 48
See application file for complete search history.

(56) References Cited

U.S. PATENT DOCUMENTS

| 3,885,977 A | 5/1975 | Lachman et al. |
| 4,598,054 A | 7/1986 | Mochida et al. |
| 5,549,725 A | 8/1996 | Kasai et al. |

(Continued)

FOREIGN PATENT DOCUMENTS

EP 945177 A2 9/1999

(Continued)

*Primary Examiner*—Jason M Greene
*Assistant Examiner*—Karla Hawkins
(74) *Attorney, Agent, or Firm*—Sughrue Mion, PLLC (57) ABSTRACT

In a ceramic honeycomb structure having large numbers of flow paths partitioned by porous cell walls, the cell walls have a porosity of 55-75%, with an average pore diameter Da of 10-30 μm and a pore area ratio Sa of 10-30% on their surfaces, and the average length La of the pores at their openings and the average width Lb of the pores at depth La from the surfaces of the cell walls meet the condition of $1.1 < Lb/La < 5$ in an arbitrary vertical cut surface of the cell walls. In the cordierite-based ceramic honeycomb structure, the ceramic contains Fe and a spinel, the amount of the spinel being 4% or less by an X-ray diffraction intensity ratio, and most of the spinel having particle sizes in a range of 0.01-5 μm.

8 Claims, 3 Drawing Sheets

U.S. PATENT DOCUMENTS

| | | |
|---|---|---|
| 6,177,382 B1 | 1/2001 | Hesse et al. |
| 6,541,407 B2 | 4/2003 | Beall et al. |
| 6,808,663 B2 | 10/2004 | Noguchi et al. |
| 6,814,774 B2 | 11/2004 | Ishihara et al. |
| 6,818,580 B2 | 11/2004 | Kumazawa et al. |
| 6,887,826 B2 | 5/2005 | Nishimura et al. |
| 2002/0198104 A1 * | 12/2002 | Nishimura et al. .......... 502/439 |
| 2005/0120690 A1 | 6/2005 | Noguchi et al. |

FOREIGN PATENT DOCUMENTS

| | | |
|---|---|---|
| JP | 50-75611 | 6/1975 |
| JP | 60-2270 B2 | 1/1985 |
| JP | 60-141668 A | 7/1985 |
| JP | 09-077573 A | 3/1997 |
| JP | 09-155189 B2 | 6/1997 |
| JP | 2938740 B2 | 6/1999 |
| JP | 11-309707 A | 11/1999 |
| JP | 2002-349234 A | 4/2002 |
| JP | 2002-309921 A | 10/2002 |
| JP | 2002-326879 A | 11/2002 |
| JP | 2002-355511 A | 12/2002 |
| JP | 2003-40687 A | 2/2003 |
| JP | 2003-120256 A | 4/2003 |
| JP | 2003-155919 A | 5/2003 |
| JP | 2003-210922 A | 7/2003 |
| JP | 2004-901 A | 1/2004 |

* cited by examiner

CERAMIC HONEYCOMB STRUCTURE AND MOLDABLE MATERIAL USABLE FOR ITS EXTRUSION MOLDING

FIELD OF THE INVENTION

The present invention relates to a ceramic honeycomb structure suitable for a ceramic honeycomb filter for capturing particulate matter such as fine carbon particles, etc. discharged mainly from diesel engines, and a moldable material usable for its extrusion molding.

BACKGROUND OF THE INVENTION

Figure 5A:
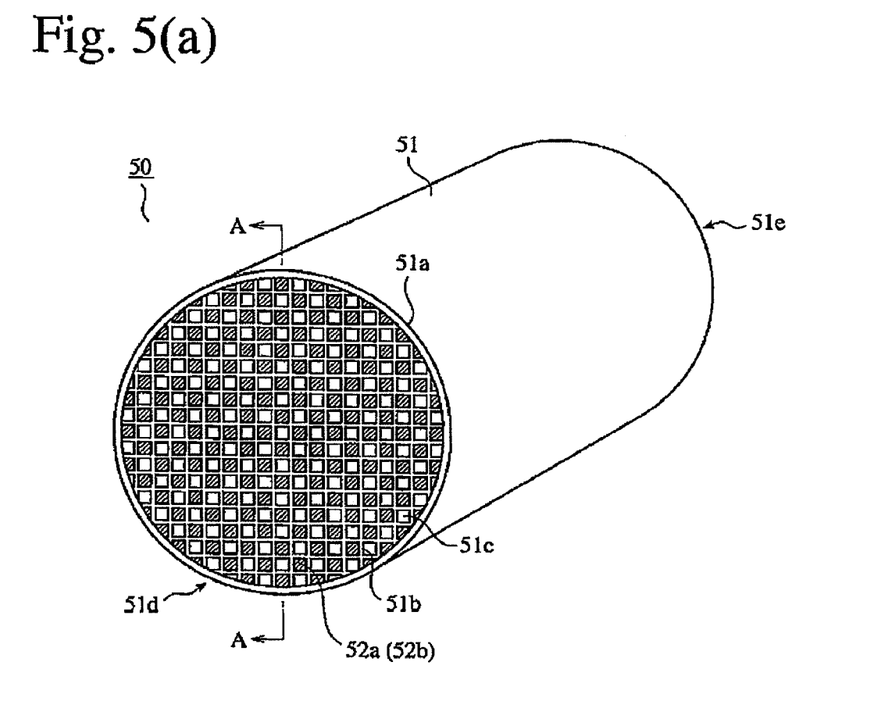
FIG. 5(a) is a schematic view showing the structure of a ceramic honeycomb filter.
Figure 5B:
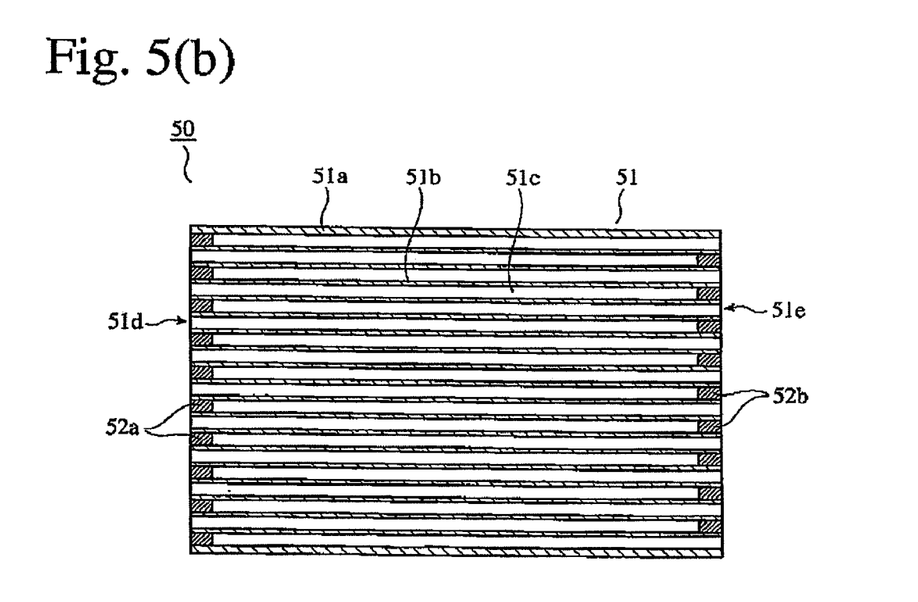
FIG. 5(b) is a cross-sectional view of taken along the line A-A in FIG. 5(a).

Attracting much attention as a ceramic honeycomb filter for capturing particulate matter contained in an exhaust gas from a diesel engine and burning the particulate matter by a heater or a burner disposed at a desired position is a ceramic honeycomb filter constituted by a ceramic honeycomb structure having flow paths partitioned by porous cell walls with predetermined flow paths plugged, a gas mainly passing through the porous cell walls. As shown in FIG. 5(a) and FIG. 5(b), a ceramic honeycomb filter 50 is usually a cylinder having a circular or elliptical cross section, which has a structure comprising a porous ceramic honeycomb structure 51 having peripheral wall 51a and cell walls 51b for defining large numbers of flow paths 51c inside the peripheral wall 51a, and plugs 52a, 52b alternately sealing inlets 51d and outlets 51e of the flow paths 51c.

As the characteristics of the ceramic honeycomb filter, a particulate-matter-capturing ratio, a pressure loss, and a particulate-matter-capturing time (time period until reaching a predetermined pressure loss from the start of capturing) are important. The particulate-matter-capturing ratio and the pressure loss are generally in a contradictory relation, and to achieve good balance between these contradictory characteristics, investigation has been being conducted so far on the control of the porosity, average pore diameter, pore diameter distribution on cell wall surfaces, etc. of the ceramic honeycomb filter. In addition, because the ceramic honeycomb filter is not only exposed to a high-temperature exhaust gas, but also heated by a heater or a burner for burning the captured particulate matter, it is required to have high thermal shock resistance to withstand severe conditions such as rapid temperature change. Thus, investigation has been being conducted to reduce its thermal expansion coefficient.

JP2002-326879A discloses a method for obtaining a high-porosity ceramic honeycomb structure by using a moldable material comprising foamed resin particles and resin powder, etc. This method provides a ceramic honeycomb structure having a porosity of 58-81% free from cracking by sintering, by adding the foamed resin particles without using a large amount of inflammable powder.

JP9-77573A discloses a honeycomb structure having a high capturing ratio, a low pressure loss and a low thermal expansion coefficient, which is formed by adding a foaming resin or an inflammable material to a cordierite-forming material, the honeycomb structure having a thermal expansion coefficient of $0.3 \times 10^{-6}/°C$. or less, a porosity of 55-80%, and an average pore diameter of 25-40 µm, and pores exposed to cell wall surfaces being constituted by small pores of 5-40 µm and large pores of 40-100 µm, the number of the small pores being 5-40 times that of the large pores.

However, in the ceramic honeycomb structures described in JP2002-326879A and JP9-77573A, no consideration is made on the shapes of pores inside the cell walls, though their porosities are as high as 58-81% and 55-80%, respectively. Accordingly, it is difficult to achieve both high capturing ratio of particulate matter and low pressure loss.

When various pore-forming agents (foaming resin particles, inflammable materials, foamed resin particles, resin powder, etc.) described in JP2002-326879A and JP9-77573A are added to cordierite material powder to obtain a high-porosity cordierite ceramic honeycomb structure, the orientation of the cordierite material powder may be disturbed during extrusion. As a result, sufficient orientation of a cordierite crystal cannot be achieved, resulting in ceramic honeycomb structures having as large thermal expansion coefficients as more than $12 \times 10^{-7}/°C$., and poor thermal shock resistance.

Development is recently conducted to put into practical use regenerable-with-catalyst ceramic honeycomb filters for continuously burning particulate matter in an exhaust gas by a catalytic reaction, which comprise ceramic honeycomb structures having cell walls with pores in which catalysts are supported. In such regenerable-with-catalyst ceramic honeycomb filters, various attempts have been conducted to increase the opening diameters and opening area ratios of pores in cell walls on the exhaust-gas-inlet side as described below, to increase the contact efficiency of particulate matter to the catalyst.

JP2002-309921A discloses an exhaust gas-cleaning apparatus comprising a porous ceramic whose pores have opening diameters of 30 µm or more in cell walls facing flow paths on the exhaust gas inlet side, and less than 30 µm in cell walls facing flow paths on the exhaust gas outlet side.

JP2002-349234A discloses a diesel exhaust gas-cleaning filter, wherein the total area of pores open to cell wall surfaces is 30% or more of the total surface area of cell walls, and wherein the total opening area of pores having diameters of 30 µm or more is 50% or more of the total opening area of all open pores.

JP2002-355511A discloses an exhaust gas-cleaning filter comprising a ceramic honeycomb structure and a catalyst supported on its cell walls, the cell walls having a porosity of 55-80%, and the percentage (%) of surface pores [expressed by B/A, wherein A is a total surface area, and B is a total area of pores, on a SEM photograph of a cell wall surface] being 20% or more.

JP2003-120256A discloses an exhaust gas-cleaning filter comprising a honeycomb structure having partition walls having large numbers of pores, and cells defined by partition walls, wherein the opening area ratio of pores having opening diameters of 10 µm or more is 20% or less of the total opening area ratio of pores open to the partition walls. This filter has a small number of small pores having opening diameters of 10 µm or less.

JP2003-40687A discloses a ceramic honeycomb structure having a porosity of 55-65% and an average pore diameter of 15-30 µm, wherein the total area of pores exposed to cell wall surfaces is 35% or more of the total surface area of cell walls.

However, even when such regenerable-with-catalyst ceramic honeycomb filter is used, the amount of particulate matter captured is more than that treated by a catalytic reaction because of low catalyst activity in an operation state at a low exhaust gas temperature, so that the particulate matter is accumulated in the pores of the cell walls, resulting in large pressure loss. Accordingly, JP2003-155919A proposes the forced regeneration of a ceramic honeycomb filter by adding a fuel to an exhaust gas upstream of the ceramic honeycomb filter when a large amount of particulate matter was accumulated.

However, when the regenerable-with-catalyst ceramic honeycomb filter is forcedly regenerated to prevent the increase of pressure loss due to the accumulation of particulate matter, the use of the ceramic honeycomb structures of JP2002-309921A to JP2003-40687A as described above, which have cell walls having pores with increased opening diameters and opening area ratios on the exhaust gas inlet side, not only provides a low capturing ratio at the start of capturing particulate matter, but also suffers pressure loss increasing as more particulate matter is captured.

Thus, in the conventional regenerable-with-catalyst ceramic honeycomb filters, whose pores open to porous cell walls have large opening diameters and opening area ratios, particulate matter is likely to easily pass through large pores without being captured, particularly at an operation stage at which the exhaust gas temperature is low, and at an initial stage with a small amount of particulate matter accumulated. Whenever the ceramic honeycomb filters are forcedly regenerated, the accumulated particulate matter is burned out, so that the filter returns to the original state. Accordingly, until a predetermined amount of particulate matter is accumulated in the pores of cell walls, a state of a low particulate-matter-capturing-ratio occurs repeatedly, with some particulate matter discharged. Once the particulate matter is accumulated in the pores of cell walls, the particulate-matter-capturing ratio is improved. However, filling the pores with particulate matter causes large pressure loss in the ceramic honeycomb filter.

OBJECTS OF THE INVENTION

Accordingly, an object of the present invention is to provide a ceramic honeycomb structure suitable for a regenerable-with-catalyst ceramic honeycomb filter, which exhibits a high particulate-matter-capturing ratio from an initial stage of capturing particulate matter even after forced regeneration, and also suffers only low pressure loss even after a large amount of particulate matter is accumulated.

Another object of the present invention is to provide a high-porosity, cordierite-based ceramic honeycomb structure having a thermal expansion coefficient of $12 \times 10^{-7}/°C$ or less.

A further object of the present invention is to provide a moldable material for producing such a ceramic honeycomb structure.

DISCLOSURE OF THE INVENTION

As a result of intense research in view of the above objects, it has been found that (1) by decreasing pore diameters on porous cell wall surfaces and increasing pore diameters inside the cell walls to make particulate matter in an exhaust gas less penetrable into pores inside the cell walls, the initial capturing ratio of particulate matter can be increased, and the pressure loss can be reduced after a large amount of particulate matter is accumulated; that (2) by optimizing fine crystals existing in the cordierite-based ceramic honeycomb structure, its thermal expansion coefficient can be reduced even with as high a porosity as 55-75%; and that (3) by controlling a storage elastic modulus and a complex viscosity coefficient in a moldable material comprising foamed hollow resin particles, a binder, water, and if necessary, a molding aid, it is possible to obtain a ceramic honeycomb structure with small pore diameters on cell wall surfaces and large pore diameters inside the cell walls. The present invention is based on such findings.

Thus, the first ceramic honeycomb structure of the present invention has large numbers of flow paths partitioned by porous cell walls, the cell walls having a porosity of 55-75%, the cell walls having an average pore diameter Da of 5-30 μm and a pore area ratio Sa of 10-30% on their surfaces, and the average opening length La of pores open to the cell wall surfaces and the average width Lb of the pores at depth La from the surfaces of the cell walls meeting the condition of $1.1 < Lb/La < 5$ in cut surfaces perpendicular to the cell wall surfaces.

The second ceramic honeycomb structure of the present invention is made of a cordierite-based ceramic containing Fe and spinel, the content of the spinel being 4% or less by an X-ray diffraction intensity ratio, and the spinel having a particle size of substantially 0.01-5 μm.

The third ceramic honeycomb structure of the present invention is made of a cordierite-based ceramic containing Fe and spinel, a ratio of the concentration of Fe in the spinel to the concentration of Fe in the cordierite being 1.1 or more (calculated as $Fe_2O_3$).

The moldable material used for the extrusion-molding of a ceramic honeycomb structure according to the present invention comprises ceramic material powder having an average particle size of 40 μm or less, foamed hollow resin particles having an average particle size of 40-100 μm, a binder, water, and if necessary, a molding aid, and has a storage elastic modulus of $5 \times 10^4$ Pa to $1.4 \times 10^6$ Pa and a complex viscosity coefficient of $1 \times 10^4$ Pa·s to $1 \times 10^7$ Pa·s when measured in a viscoelasticity test at a frequency of 1 rad/s.

DESCRIPTION OF THE PREFERRED EMBODIMENTS

[1] Ceramic Honeycomb Structure (1) First Ceramic Honeycomb Structure

The first ceramic honeycomb structure of the present invention meets the conditions that (a) cell walls has a porosity of 55-75%, (b) the cell walls have an average pore diameter Da of 5-30 μm on their surfaces, (c) the cell walls have a pore area ratio Sa of 10-30% on their surfaces, and (d) the average length La of openings of the pore and the average width Lb of the pores at the depth La from the surface of the cell walls satisfy the condition of $1.1 < Lb/La < 5$ in arbitrary vertical cut surfaces of the cell walls. The ceramic honeycomb structure meeting these conditions can keep a high capturing ratio with low pressure loss from an initial stage of capturing particulate matter. The cell walls preferably have a porosity of 58-70%.

This reason is as follows: The cell walls of the ceramic honeycomb structure have three-dimensionally communicating pores formed by a cross-linking function of sintered ceramic materials and the burnout of foamed hollow resin particles, and the pores include those open to the cell wall surfaces, and those closed in the cell walls. When pores appearing on arbitrary cut surfaces perpendicular to the cell wall surfaces meet the condition of Lb/La>1.1, wherein La is an average opening length obtained by dividing the total length of the openings of pores (number: n) open to cell wall surfaces by n, and Lb is an average internal width obtained by dividing the total width of the pores (number: n) at the depth La from the cell wall surfaces by n, it is the that the pores are sufficiently expanded inside the cell walls, having a so-called "ink bottle shape." Here, the "width of a pore at the depth La from the cell wall surface" is the length of a line crossing each pore, when the line is drawn in parallel with the cell wall surface with a distance La.

Figure 1:
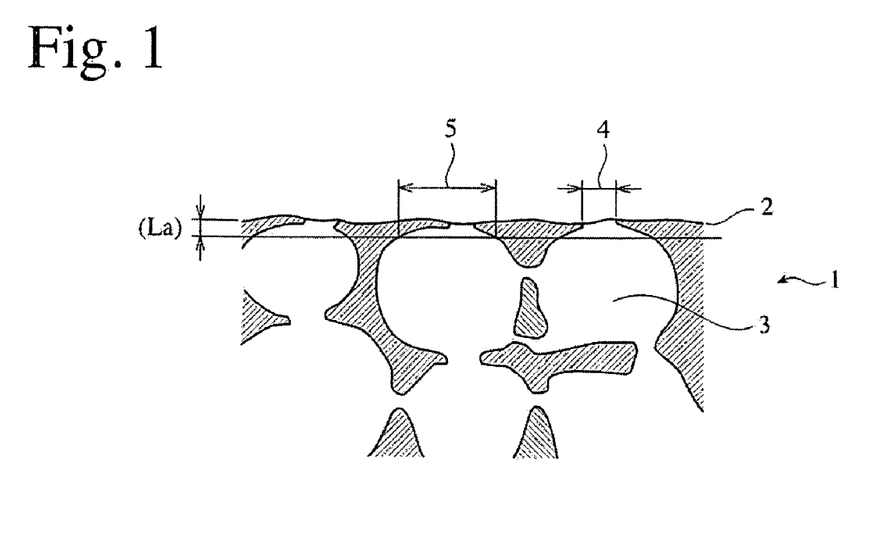
FIG. 1 is a schematic cross-sectional view showing a cell wall of the ceramic honeycomb structure of the present invention.
Figure 2:
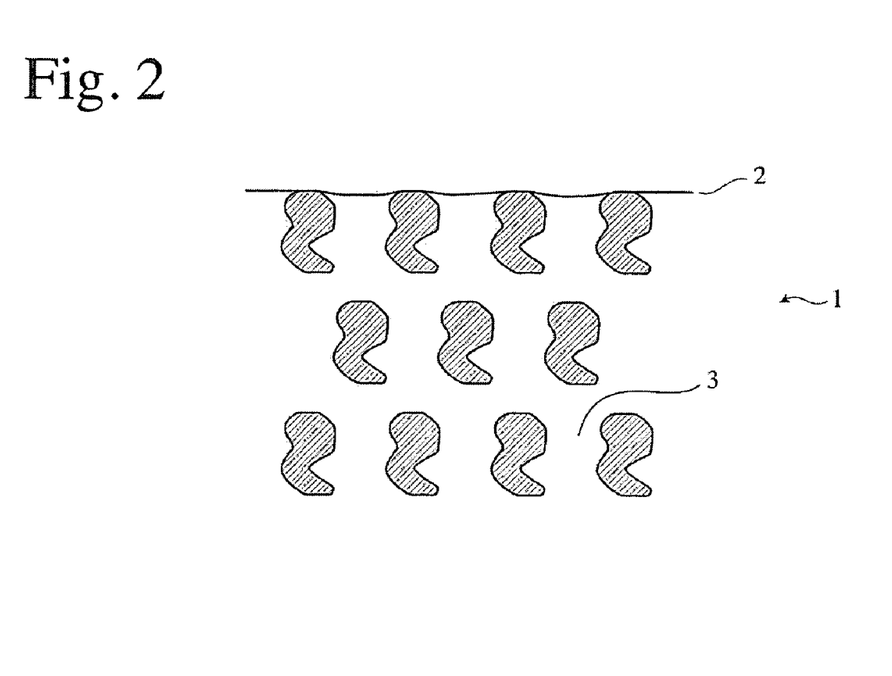
FIG. 2 is a schematic cross-sectional view showing a cell wall of a conventional ceramic honeycomb structure.

FIG. 1 is a schematic vertical cross-sectional view showing a cell wall of the ceramic honeycomb structure of the present invention near a surface, and FIG. 2 is a schematic vertical cross-sectional view showing a cell wall of the ceramic honeycomb structure of JP2003-120256A near a surface. While the pore diameters at the surface 2 of the cell wall 1 are substantially equal to those inside the cell wall in the conventional ceramic honeycomb structure as shown in FIG. 2, the pore diameters 4 at the surface 2 of the cell wall 1 are smaller than the pore diameters 5 inside the cell wall, providing pores 3 with so-called "ink bottle shapes" in the ceramic honeycomb structure of the present invention as shown in FIG. 1.

When an exhaust gas containing particulate matter passes through the cell walls having such pores, the particulate matter does not easily enter into the pores but are agglomerated near pore openings, because the particulate matter strongly tends to be agglomerated, and because the average pore diameter Da is as small as 5-30 μm on cell wall surfaces. Thus, the particulate matter immediately covers the openings of pores. As a result, a layer of particulate matter is gradually formed on the pores throughout the cell wall surfaces. As the particulate matter layer becomes thicker on the cell wall surfaces, the pressure loss increases, though the pressure loss increase of the cell walls per se is smaller than when particulate matter is accumulated in the pores. It is thus possible to avoid the problem of pressure loss increase caused by increasing the pore opening diameters of the conventional ceramic honeycomb structure on the exhaust gas inlet side.

In addition, because a particulate matter layer per se acts as a filter, it is possible to keep the particulate-matter-capturing ratio high from an initial capturing stage. Further, because the particulate matter have particle sizes of 100 nm or less, the layer of fine particulate matter has space in the order of nanometers, so that a filter constituted by such ceramic honeycomb structure can capture particulate matter in the order of nanometers. Thus, the ceramic honeycomb structure of the present invention having ink-bottle-shaped pores having smaller diameters on cell wall surfaces and larger diameters inside the cell walls can achieve a high particulate matter-capturing ratio even at an initial stage with a temperature lower than a catalyst-activating temperature, and does not suffer large pressure loss even after much particulate matter is accumulated, because of such pore structure that pores have increased diameters below the cell wall surfaces. However, when Lb/La is too large, the pressure loss of cell walls is too large from the initial stage (in the case of too small pore diameters on cell wall surfaces), or the honeycomb structure has insufficient strength (in the case of too large pores inside the cell walls). Accordingly, the condition of Lb/La<5 should be met. Preferably, the condition of 1.3<Lb/La<4.5 is met.

Despite that the cell walls have as large a porosity as 55-75%, the first ceramic honeycomb structure of the present invention has as small an average pore diameter Da as 5-30 μm and as small a pore area ratio Sa as 10-30% on cell wall surfaces. A larger porosity generally provides a larger pore volume, resulting in a larger pore area ratio on cell wall surfaces. In the case of the filter of JP2003-40687A, for instance, the porosity of 55% or more provides Sa of more than 30% in the cell walls. On the other hand, the ceramic honeycomb structure of the present invention has Sa of 10-30%, because it is formed from a moldable material with controlled storage elastic modulus and complex viscosity coefficient. When Sa is less than 10%, the number of pores open to the cell wall surfaces is too small, resulting in too high pressure loss at the initial stage. When Sa is more than 30%, the ceramic honeycomb structure has reduced mechanical strength. The preferred range of Sa is 15-25%.

When the average pore diameter Da on cell wall surfaces is less than 5 μm, there is large pressure loss from the initial stage. When Da is more than 30 μm, particulate matter easily enters into the cell walls, resulting in a low initial particulate matter-capturing ratio, and increase in the amount of particulate matter captured leads to increased pressure loss, and further the honeycomb structure has low strength. The preferred range of Da is 15-25 μm.

The porosity of the cell walls is 55-75%, not only to increase the percentage of pores existing in the cell walls to keep pressure loss low at the initial stage of capturing particulate matter, but also to impart practically sufficient mechanical strength to the ceramic honeycomb structure. The preferred porosity of the cell walls is 58-70%.

The average pore diameter Da and the pore area ratio Sa on cell wall surfaces were determined from five SEM photographs (magnification: 100 times, field: 1.1 mm×0.8 mm) of the cell wall surfaces by an image analyzer. The average pore diameter Da was determined by measuring diameters of each pore passing through its center of gravity at an interval of 2° and averaging the measured diameters throughout the field taken. The average opening length La and the average internal width Lb of pores were determined from five SEM photographs (magnification: 100 times, field: 1.1 mm×0.8 mm) of the vertically cut surfaces of the cell walls by an image analyzer.

(2) Second Ceramic Honeycomb Structure

The second ceramic honeycomb structure of the present invention is characterized in that (a) it is made of a cordierite-based ceramic, (b) the ceramic contains Fe and spinel, (c) the spinel content is 4% or less by an X-ray diffraction intensity ratio, and (d) most of the particle size distribution of the spinel is within a range of 0.01-5 μm.

The spinel is a spinel-type composite oxide crystal having a composition of $MgO.Al_2O_3$. The spinel contained in a ceramic based on cordierite ($5SiO_2.2Al_2O_3.2MgO$) can be confirmed by diffraction peaks in an X-ray diffraction pattern. The X-ray diffraction intensity is measured by a powder X-ray diffraction method using powder obtained by finely pulverizing the ceramic honeycomb structure and adjusting its particle size by a sieve having an opening diameter of 1 μm. The X-ray diffraction intensity ratio (%) is a ratio of Isp[220]/Ic[102], wherein Isp[220] is an X-ray diffraction intensity of a [220] plane of spinel, and Ic[102] is an X-ray diffraction intensity of a [102] plane of cordierite, both in an X-ray diffraction pattern.

To produce the cordierite-based ceramic honeycomb structure (cordierite ceramic honeycomb structure), it is general to use clay minerals such as kaolin, talc, etc., and alumina, silica, etc. as cordierite-forming materials. Because kaolin and talc contain Fe as an inevitable impurity, the cordierite ceramic honeycomb structure also contains Fe. As the amount of Fe in cordierite increases, a cordierite crystal has a larger thermal expansion coefficient, so that the thermal expansion coefficient of the cordierite ceramic honeycomb structure increases with the concentration of Fe. However, because a ceramic forming the cordierite ceramic honeycomb structure of the present invention contains fine spinel, Fe exists in spinel at a high concentration, while the concentration of Fe is low in cordierite. As a result, the cordierite ceramic honeycomb structure of the present invention has a small thermal expansion coefficient.

When the content of spinel having a large thermal expansion coefficient exceeds 4% by an X-ray diffraction intensity ratio in the cordierite-based ceramic, the thermal expansion coefficient of the ceramic honeycomb structure becomes more than $12 \times 10^{-7}/°C$.

Because most of spinel is as fine as 0.01-5 μm in particle size, it has a large specific surface area, and Fe is dissolved therein at a high concentration. As a result, the concentration of Fe decreases in cordierite, resulting in decrease in the thermal expansion coefficient of a cordierite crystal and thus that of the cordierite ceramic honeycomb structure. When the particle size of spinel is more than 5 μm, it is difficult for Fe to exist in spinel at a high concentration. To accelerate the concentration of Fe in spinel, the particle size of spinel is preferably substantially 3 μm or less. Incidentally, the particle size of spinel is a biaxial average diameter $R[=A+B)/2]$ determined by (a) taking a photograph (10,000 times) of a Z-contrast image of a thin micro-sample having a thickness of about 0.1 μm taken from the cell walls by a transmission electron microscope (TEM), (b) identifying the spinel by the micro-region composition analysis by an energy-dispersive X-ray spectrometer (EDX), (c) measuring the maximum diameter A and its perpendicular diameter B of the spinel on the Z-contrast image photograph using an image analyzer, and (d) calculating an arithmetic average of the maximum diameter A and the perpendicular diameter B.

The content of Fe in the cordierite-based ceramic is preferably 0.1-2% by mass (calculated as $Fe_2O_3$). When the Fe content exceeds 2% by mass, the cordierite has too large a thermal expansion coefficient. The further preferred content of Fe in cordierite is 0.2-1.2% by mass (calculated as $Fe_2O_3$).

When the percentage by number of spinel within a particle size range of 0.01-5 μm is 80% or more to the total number of spinel, the spinel has a large specific surface area, preferably making it possible for Fe to exist in spinel at a high concentration. The percentage by number of spinel having a particle size of 0.01-3 μm is more preferably 80% or more. The percentage by number of spinel having a particle size of 0.01-5 μm is determined by measuring the particle sizes (biaxial average diameters R) of arbitrary spinel particles in the number N of 20 or more, counting the number n of spinel particles having particle sizes of 0.01-5 μm, and calculating $n/N \times 100(\%)$.

(3) Third Ceramic Honeycomb Structure

The third ceramic honeycomb structure of the present invention is characterized in that (a) it is formed by a cordierite-based ceramic, (b) the ceramic contains Fe and spinel, and (c) a ratio of the concentration of Fe in the spinel to the concentration of Fe in the cordierite is 1.1 or more (calculated as $Fe_2O_3$).

Increase in the concentration of Fe in cordierite leads to a higher thermal expansion coefficient of the cordierite ceramic honeycomb structure. However, because the cordierite ceramic honeycomb structure of the present invention meets the condition of (concentration of $Fe_2O_3$ in spinel)/(concentration of $Fe_2O_3$ in cordierite)$\geq 1.1$, namely, because Fe is concentrated in spinel, there is a small amount of Fe in cordierite, providing the cordierite ceramic honeycomb structure with a small thermal expansion coefficient.

When the ratio of (concentration of $Fe_2O_3$ in spinel)/(concentration of $Fe_2O_3$ in cordierite) is less than 1.1, there is a high concentration of Fe in cordierite, resulting in a large thermal expansion coefficient of the ceramic honeycomb structure mainly comprising a cordierite crystal. The ratio of (concentration of $Fe_2O_3$ in spinel)/(concentration of $Fe_2O_3$ in cordierite) is preferably 15 or less. When the ratio of (concentration of $Fe_2O_3$ in spinel)/(concentration of $Fe_2O_3$ in cordierite) is more than 15, the spinel per se has too large a thermal expansion coefficient, making it likely that the ceramic honeycomb structure has a large thermal expansion coefficient. The more preferred ratio of (concentration of $Fe_2O_3$ in spinel)/(concentration of $Fe_2O_3$ in cordierite) is 3-10.

When the concentration of Fe in spinel is 0.1-10% by mass (calculated as $Fe_2O_3$), Fe is concentrated in spinel, resulting in a small amount of Fe in cordierite, and thus a large effect of reducing the thermal expansion coefficient of the cordierite ceramic honeycomb structure mainly comprising a cordierite crystal.

(4) Common Features of Ceramic Honeycomb Structures

The cell walls of the ceramic honeycomb structure of the present invention preferably support a catalyst. With a catalyst supported on the cell walls, particulate matter entering into the pores of the cell walls is burned out by the function of the catalyst.

The ceramic honeycomb structure of the present invention preferably has a cell wall thickness of 0.1-0.5 mm and a cell wall pitch of 1.2-3 mm. When the cell wall thickness is less than 0.1 mm, the ceramic honeycomb structure has insufficient strength. When the cell wall thickness is more than 0.5 mm, the cell walls have large resistance to the passing of an exhaust gas even with high porosity, so that the ceramic honeycomb filter suffers large pressure loss. The more preferred thickness of the cell walls is 0.2-0.4 mm. When the cell wall pitch is less than 1.2 mm, the ceramic honeycomb structure has a small opening area at the flow path inlet, resulting in large pressure loss. When the cell wall pitch is more than 3 mm, the cell wall area per a unit volume is small, resulting in low efficiently of capturing particulate matter. The more preferred pitch of the cell walls is 1.3-1.8 mm.

The ceramic honeycomb structure of the present invention used for a filter for removing particulate matter from an exhaust gas discharged from a diesel engine is preferably formed by a ceramic with excellent heat resistance, specifically a ceramic comprising as a main component at least one selected from the group consisting of cordierite, alumina, mullite, aluminum titanate, silicon nitride, carbon nitride and LAS. Among them, a cordierite-based ceramic honeycomb filter is preferable because of a reasonable price, excellent heat resistance and corrosion resistance, and a low thermal expansion.

[2] Moldable Material to be Extrusion-Molded to Ceramic Honeycomb Structure

The moldable material used for extrusion-molding the ceramic honeycomb structure of the present invention is characterized in that (a) it contains ceramic material powder having an average particle size of 40 μm or less, foamed hollow resin particles having average particle size 40-100 μm, a binder, and water, and further a molding aid, if necessary, and (b) it has a storage elastic modulus of $5 \times 10^4$ Pa to $1.4 \times 10^6$ Pa and a complex viscosity coefficient of $1 \times 10^4$ Pa·s to $1 \times 10^7$ Pa·s when measured in a viscoelasticity test at a frequency of 1 rad/s. When this moldable material is extruded through a slit of a honeycomb-structure-extruding orifice and sintered, ink-bottle-shaped pores meeting the condition of (average internal width Lb of pores)/(average opening length La of pores) >1.1 can be obtained.

The reasons why ink-bottle-shaped pores having small diameters on cell wall surfaces and large diameters inside the cell walls are obtained are that a relatively soft and shape-retainable moldable material exhibiting a storage elastic modulus of $5 \times 10^4$ Pa to $1.4 \times 10^6$ Pa and a complex viscosity coefficient of $1 \times 10^4$ Pa·s to $1 \times 10^7$ Pa·s when measured in a viscoelasticity test at a frequency of 1 rad/s is obtained by combining the ceramic powder and the foamed hollow resin particles having the above particle sizes, and that the use of such moldable material ensures the foamed hollow resin particles to retain substantially spherical shapes even under pressure while passing through the extrusion orifice slit and after sintering, thereby permitting substantially spherical pores communicating through small gaps between ceramic particles to be open to the cell wall surfaces.

The reason why the ceramic material powder has an average particle size of 40 μm or less is that if more than 40 μm, there are large pores between ceramic material powder, making it difficult to achieve the condition of Lb/La>1.1. The reason why the foamed hollow resin particles have an average particle size of 40-100 μm is that if less than 40 μm, the pore diameters inside the cell walls are small, making it difficult to achieve the condition of Lb/La>1.1, and that if more than 100 μm, large pores are formed in the cell walls, providing the honeycomb structure with low mechanical strength.

When the storage elastic modulus is less than $5 \times 10^4$ Pa or the complex viscosity coefficient is less than $1 \times 10^4$ Pa·s when measured in a viscoelasticity test at a frequency of 1 rad/s, deformation is likely to occur during the molding and drying steps of the honeycomb structure because of low shape retention of a green body. On the other hand, when the storage elastic modulus is more than $1.4 \times 10^6$ Pa or the complex viscosity coefficient is more than $1 \times 10^7$ Pa·s, the moldable material is too hard, resulting in the deformation of the pore-forming agent under molding pressure, which leads to larger pore diameters on the cell wall surfaces. It is thus difficult to achieve the condition of Lb/La>1.1. The preferred range of the storage elastic modulus is $5 \times 10^4$ Pa to $1 \times 10^6$ Pa.

The storage elastic modulus of $5 \times 10^4$ Pa to $1.4 \times 10^6$ Pa and the complex viscosity coefficient of $1 \times 10^4$ Pa·s to $1 \times 10^7$ Pa·s can be achieved by controlling the type and amount of the binder, the amount of water, and if necessary, the amount of the molding aid (lubricant, etc.), etc., in addition to the above conditions. Particularly, 7-12 parts by mass of a binder comprising methylcellulose (M) having a 2-% aqueous solution viscosity (20° C.) of 5 Pa·s or less, and hydroxypropyl methylcellulose (H) having a 2-% aqueous solution viscosity (20° C.) of 20 Pa·s or more at an M/H mass ratio of more than 50/50 and 90/10 or less is preferably added to 100 parts by mass of the ceramic powder.

When a pore-forming agent not having a substantially spherical shape, for instance, a flat pore-forming agent such as graphite, etc., is used, a flat surface of the pore-forming agent is aligned along the cell wall surfaces, so that it is difficult to form pores meeting the condition of Lb/La>1.1.

In the case of a cordierite ceramic honeycomb structure, pores produced during the step of forming cordierite can be made small by controlling the average particle size of talc to 20 μm or less, the average particle size of silica to 30 μm or less, and the average particle size of alumina to 20 μm or less in the cordierite-forming material. Accordingly, with the shape of substantially spherical, large pore-forming agent effectively transferred, pores meeting the condition of Lb/La>1.1 can be easily formed.

The cordierite-based ceramic may contain CaO, $Na_2O$, $K_2O$, $TiO_2$, PbO, $P_2O_5$, etc. in ranges not hindering the above function, and also crystals such as mullite, corundum, etc.

[3] Production Method of Ceramic Honeycomb Structure

For the cordierite-forming material, silica, alumina, aluminum hydroxide, etc. are used in addition to kaolin and talc. The concentration of $Fe_2O_3$ is 0.2-0.8% by mass in kaolin, 0.5-1.8% by mass in talc, and 0.001-0.1% by mass in silica. Kaolin preferably has the following particle size distribution.

Powder having a particle size of 20 μm or more: 0-10% by mass,

Powder having a particle size of 10 μm or more: 5-25% by mass,

Powder having a particle size of 5 μm or more: 15-50% by mass, and

Powder having a particle size of 2 μm or more: 50-90% by mass.

Talc preferably has the following particle size distribution.

Powder having a particle size of 45 μm or more: 3-20% by mass,

Powder having a particle size of 20 μm or more: 20-40% by mass,

Powder having a particle size of 10 μm or more: 50-70% by mass,

Powder having a particle size of 5 μm or more: 70-90% by mass, and

Powder having a particle size of 2 μm or more: 80-95% by mass.

Silica preferably has the following particle size distribution.

Powder having a particle size of 75-250 μm: 1-10% by mass,

Powder having a particle size of 45 μm or more: 3-25% by mass,

Powder having a particle size of 20 μm or more: 31-52% by mass,

Powder having a particle size of 10 μm or more: 49-70% by mass,

Powder having a particle size of 5 μm or more: 65-90% by mass, and

Powder having a particle size of 2 μm or more: 80-99.5% by mass.

Using kaolin, talc and silica having a particle size distribution and Fe as described above, cordierite as a main crystal and fine spinel are precipitated during the sintering process, with Fe concentrated in the spinel.

The cordierite-forming powder preferably has a composition comprising 48-50% by mass of $SiO_2$, 35-37% by mass of $Al_2O_3$, and 13-15% by mass of MgO, the total of $SiO_2$, $Al_2O_3$ and MgO being 100% by mass. Outside the ranges, it is likely that spinel is precipitated in an amount exceeding 4% by mass, or that no desired spinel is precipitated.

As the pore-forming agent for obtaining high porosity, graphite, carbon powder, flour, starch, charcoal powder, pulp powder, polyethylene, polypropylene, polystyrene, nylon, polyesters, acrylic resins, phenol resins, epoxy resins, ethylene-vinyl acetate copolymers, styrene-butadiene block polymers, styrene-isoprene block polymers, urethane resins, waxes, etc. may be used in addition to the above foamed hollow resin particles. When pluralities of pore-forming agents having different burning temperatures are added, it is possible to prevent cracking, which would occur when the pore-forming agent is rapidly burned in a narrow temperature range.

To obtain a high-porosity cordierite ceramic honeycomb structure, the amount of the foamed hollow resin particles is preferably 1-15 parts by mass, more preferably 5-15 parts by mass, most preferably 10-15 parts by mass, per 100 parts by mass of the cordierite-forming powder. When too much foamed hollow resin particles are added, the green body is not so sufficiently shape-retainable that it is likely to suffer cracking during the sintering.

Under the sintering condition that the green body is kept at the highest temperature of 1350-1450° C. for 10 hours or more, the cordieritization of the ceramic materials is accelerated. In a temperature-elevating process, the temperature-elevating speed is preferably less than 30° C./hr in a temperature range (about 1000° C.-1200° C.) in which the cordierite ceramic honeycomb structure thermally shrinks, and less than 80° C./hr in a temperature range after the thermal shrinkage ends. With the cordierite-forming powder and the temperature-elevating speed controlled, cordierite as a main crystal and fine spinel are precipitated, with Fe concentrated in the spinel. When a cooling speed is as high as 30° C./hr or more after the sintering, the spinel is made finer.

The present invention will be explained in further detail referring to Examples below, without intension of restricting the present invention thereto.

Examples 1-12

Powders of kaolin, talc, alumina, aluminum hydroxide and silica, etc. each having an average particle size of 40 μm or less were mixed to obtain a cordierite-forming powder, at such mass ratios of $SiO_2$:48-52%, $Al_2O_3$: 33-37%, MgO: 12-15%, CaO: 0-0.05%, $Na_2O$: 0-0.05%, $K_2O$: 0-0.05%, $TiO_2$: 0-1.0%, $Fe_2O_3$:0-1.0%, PbO: 0-0.1%, and $P_2O_5$:0-0.2%. This cordierite-forming powder was mixed with foamed hollow resin particles having an average particle size of 65 μm and methylcellulose, and then blended with water to obtain a moldable cordierite-forming material with plasticity. This moldable material was extrusion-molded through an extrusion orifice to obtain a green body having a structure of a honeycomb, which was dried and then sintered at the highest temperature of 1400° C. for 200 hours, to obtain a ceramic honeycomb structure having an outer diameter of 267 mm, a length of 304 mm, a cell wall pitch of 1.57 mm, and a cell wall thickness of 0.32 mm. Table 1 shows the storage elastic modulus and complex viscosity coefficient of the moldable material, the porosity of the porous cell walls, an average pore diameter Da and a pore area ratio Sa on cell wall surfaces, and a ratio (Lb/La) of an average internal width Lb to an average opening length La of pores. Production conditions such as the particle sizes and amounts of the cordierite-forming powder and the foamed hollow resin particles, the amounts of water and the binder, blending conditions, extrusion conditions, sintering conditions, etc. were set such that the conditions shown in Table 1 were met.

The storage elastic modulus and complex viscosity coefficient of the moldable material were measured at a frequency of 1 rad/sec. and a temperature of 10° C. using a dynamic spectrometer RDS available from Rheometric Scientific.

After plugging the flow path ends of each ceramic honeycomb structure with a slurry of a cordierite-forming material alternately, the plugging slurry was dried and sintered to obtain a cordierite honeycomb filter. The plugs in the flow paths were as long as 7-10 mm.

In a pressure loss test stand, introduced into each ceramic honeycomb filter were 17 g of fine carbon particles having an average particle size of 0.042 μm as particulate matter (corresponding to 1 g of the fine carbon particles per 1 L of a filter volume) at a flow rate of 3 g/hr together with air at a flow rate of 10 $Nm^3$/min. A capturing ratio of the fine carbon particles, pressure loss and isostatic strength were measured by methods described below.

The results are shown in Table 1.

The capturing ratio of the fine carbon particles was calculated from the amount of the fine carbon particles introduced and that of those captured.

The evaluation of the capturing ratio of the fine carbon particles was as follows:
  Excellent; Capturing ratio was 95% or more,
  Good; Capturing ratio was 90% or more, and
  Poor; Capturing ratio was less than 90%.

The pressure loss (mmAq) was pressure difference between the inlet and outlet sides. The pressure loss increase ratio (%) was calculated by 100×[(pressure loss after introducing 1 g/L of carbon)−(pressure loss before introducing carbon)]/(pressure loss before introducing carbon). The evaluation of the pressure loss was as follows:
  Excellent; Pressure loss increase ratio was 15% or less,
  Good; Pressure loss increase ratio was 20% or less, and
  Poor; Pressure loss increase ratio was more than 20%.

The isostatic strength of the ceramic honeycomb structure was measured according to the Japan Automotive Standards Organization (JASO) M505-87 issued by the Society of Automotive Engineers of Japan, Inc. With 20-mm-thick aluminum plates attached to both longitudinal end surfaces of the ceramic honeycomb structure to tightly close both ends thereof, and with a 2-mm-thick rubber closely attached to an outer wall surface of the ceramic honeycomb structure, the ceramic honeycomb structure was charged into a pressure container. Water was introduced into the pressure container to apply an increasing isostatic pressure to the outer wall surface of the ceramic honeycomb structure to determine an isostatic pressure at which the ceramic honeycomb structure was broken, and the isostatic pressure was regarded as the isostatic strength. The evaluation of the isostatic strength was as follows:
  Excellent; Isostatic strength was 1.8 MPa or more,
  Good; Isostatic strength was 1.5 MPa or more, and
  Poor; Isostatic strength was less than 1.5 MPa.

The overall evaluation was as follows:
  Excellent; All of the capturing ratio of fine carbon particles, the pressure loss and the isostatic strength were "excellent,"
  Good; Any of them were "excellent" or "good," and
  Poor; At least one of them was "poor."

A test piece was cut out of a porous cell wall of the ceramic honeycomb filter broken in the isostatic strength test, to measure porosity, and the average opening length La and average internal width Lb of pores to determine Lb/La. The results are shown in Table 1. The porosity was measured by a mercury penetration method using Autopore III available from Micromeritics.

The average pore diameter Da and pore area ratio Sa of the porous cell walls on their surfaces, and the average opening length La and average internal width Lb of pores were determined by image analysis on SEM photographs (100 times) taken on cell wall surfaces and cut surfaces perpendicular thereto. The average pore diameter Da was calculated by averaging pore diameters measured along radii passing through their centers of gravity at an interval of 2° throughout a field photographed.

In the ceramic honeycomb filters of Examples 1-12, as is clear from Table 1, the average pore diameter Da on cell wall surfaces was within a range of 5-30 μm, the pore area ratio Sa on cell wall surfaces was within a range of 10-30%, and the average opening length La and average internal width Lb of pores met the relation of $1.1<Lb/La<5.0$. Accordingly, all of the particulate-matter-capturing ratio, the pressure loss and the isostatic strength were "excellent" or "good," passing the overall evaluation of "good." Among them, the ceramic honeycomb filters of Examples 3, 5, 8 and 9 were evaluated as "excellent" as a whole, because they had average pore diameters Da of 15-17 μm and pore area ratios Sa of 15-25% on cell wall surfaces, and Lb/La of 1.3-3.1, which was in a preferred range.

The ceramic honeycomb filter of Comparative Example 1 was produced in the same manner as in Example 1, except that a moldable material was prepared to have a storage elastic modulus of $2\times10^6$ Pa and a complex viscosity coefficient of $2\times10^7$ Pa·s. The ceramic honeycomb filters of Comparative Examples 2 and 3 were produced in the same manner as in Example 1 except for using foamed hollow resin particles having average particle sizes of 20 μm and 120 μm, respectively. The ceramic honeycomb filters of Comparative Examples 4 and 5 were produced in the same manner as in Example 1 except for changing the amount of foamed hollow resin particles added. The ceramic honeycomb filter of Comparative Example 6 was produced in the same manner as in Example 1 except for adjusting the storage elastic modulus and complex viscosity coefficient of the moldable material to $5\times10^4$ Pa and $1\times10^4$ Pas, respectively, and using foamed hollow resin particles having an average particle size of 120 μm.

The ceramic honeycomb filters of Comparative Examples 1-6 were measured with respect to particulate-matter-capturing ratio, pressure loss and isostatic strength in the same manner as in Example 1. The overall evaluation of the ceramic honeycomb filter of Comparative Example 1 was "poor," because its particulate-matter-capturing ratio and pressure loss were "poor" due to the fact that Lb/La was 1 or less. In the ceramic honeycomb filter of Comparative Example 2, the pressure loss was "poor" because it had an average pore diameter Da of less than 10 μm on cell wall surfaces. In the ceramic honeycomb filter of Comparative Example 3, any of the capturing ratio, the pressure loss and the isostatic strength was "poor," resulting in the overall evaluation of "poor," because the average pore diameter Da on cell wall surfaces was more than 30 μm. In the ceramic honeycomb filter of Comparative Example 4, the pressure loss was "poor" because the pore area ratio Sa on cell wall surfaces was less than 10%. In the ceramic honeycomb filter of Comparative Example 5, the isostatic strength was "poor," resulting in the overall evaluation of "poor," because the pore area ratio Sa on cell wall surfaces was more than 30%. In the ceramic honeycomb filter of Comparative Example 6, the pressure loss and isostatic strength were "poor," resulting in the overall evaluation of "poor," because the average pore diameter Da on cell wall surfaces was less than 5 μm, and Lb/La was 5 or more.

TABLE 1

| | Properties of Moldable Material | | Properties of cell walls | | |
| --- | --- | --- | --- | --- | --- |
| No. | Storage Elastic Modulus (Pa) | Complex Viscosity Coefficient (Pa·s) | Porosity (%) | Pore Area Ratio Sa (%) | Average Pore Diameter Da (μm) |
| Example 1 | $2 \times 10^5$ | $5 \times 10^5$ | 63 | 20 | 14 |
| Example 2 | $1.4 \times 10^6$ | $1 \times 10^7$ | 59 | 30 | 30 |
| Example 3 | $8 \times 10^4$ | $1 \times 10^5$ | 65 | 25 | 17 |
| Example 4 | $3 \times 10^5$ | $5 \times 10^5$ | 70 | 30 | 20 |
| Example 5 | $2 \times 10^5$ | $5 \times 10^5$ | 62 | 24 | 17 |
| Example 6 | $2 \times 10^5$ | $5 \times 10^5$ | 64 | 20 | 14 |
| Example 7 | $3 \times 10^5$ | $6 \times 10^5$ | 58 | 30 | 25 |
| Example 8 | $1 \times 10^5$ | $3 \times 10^5$ | 58 | 21 | 16 |
| Example 9 | $8 \times 10^4$ | $1 \times 10^5$ | 60 | 15 | 15 |
| Example 10 | $6 \times 10^4$ | $8 \times 10^4$ | 66 | 16 | 11 |
| Example 11 | $6 \times 10^4$ | $8 \times 10^4$ | 55 | 14 | 11 |
| Example 12 | $5 \times 10^4$ | $1 \times 10^4$ | 75 | 10 | 5 |
| Comparative Example 1 | $2 \times 10^6$ | $2 \times 10^7$ | 63 | 31 | 31 |
| Comparative Example 2 | $1.8 \times 10^6$ | $2 \times 10^7$ | 63 | 21 | 4 |
| Comparative Example 3 | $1.8 \times 10^6$ | $2 \times 10^7$ | 58 | 61 | 46 |
| Comparative Example 4 | $1.8 \times 10^6$ | $2 \times 10^7$ | 52 | 8 | 18 |
| Comparative Example 5 | $18 \times 10^6$ | $2 \times 10^7$ | 78 | 35 | 18 |
| Comparative Example 6 | $5 \times 10^4$ | $1 \times 10^4$ | 63 | 10 | 4 |

| | | Properties of Filter | | | |
| --- | --- | --- | --- | --- | --- |
| No. | Lb/La | Capturing Ratio | Pressure Loss | Isostatic Strength | Overall Evaluation |
| Example 1 | 1.2 | Excellent | Good | Excellent | Good |
| Example 2 | 1.2 | Good | Good | Good | Good |
| Example 3 | 1.3 | Excellent | Excellent | Excellent | Excellent |
| Example 4 | 1.3 | Excellent | Excellent | Good | Good |
| Example 5 | 1.4 | Excellent | Excellent | Excellent | Excellent |
| Example 6 | 1.5 | Excellent | Good | Excellent | Good |
| Example 7 | 1.5 | Excellent | Excellent | Good | Good |
| Example 8 | 2.8 | Excellent | Excellent | Excellent | Excellent |

TABLE 1-continued

| | | | | | |
|---|---|---|---|---|---|
| Example 9 | 3.1 | Excellent | Excellent | Excellent | Excellent |
| Example 10 | 4.4 | Excellent | Good | Excellent | Good |
| Example 11 | 4.5 | Excellent | Good | Excellent | Good |
| Example 12 | 4.9 | Excellent | Good | Good | Good |
| Comparative Example 1 | 0.5 | Poor | Good | Poor | Poor |
| Comparative Example 2 | 1.1 | Excellent | Poor | Excellent | Poor |
| Comparative Example 3 | 1.1 | Poor | Poor | Poor | Poor |
| Comparative Example 4 | 1.1 | Good | Poor | Excellent | Poor |
| Comparative Example 5 | 1.1 | Good | Excellent | Poor | Poor |
| Comparative Example 6 | 5.0 | Excellent | Poor | Poor | Poor |

Examples 13-16

Comparative Examples 7 and 8

Kaolin, talc, fused silica, alumina and aluminum hydroxide each having an average particle size, a particle size distribution and an $Fe_2O_3$ content shown in Tables 2 and 3 were mixed at ratios of ($SiO_2$—$Al_2O_3$—MgO) shown in Table 4. 100 parts by mass of the resultant cordierite-forming material was mixed with 12 parts by mass of foamed hollow resin particles, 5 parts by mass of methylcellulose, and 2 parts by mass of hydroxypropyl methylcellulose. The average particle size and particle size distribution of the material powders shown in Table 2 were measured using a laser-diffraction particle size distribution analyzer LMS-30 available from Seishin Enterprise Co., Ltd. 100 parts by mass of each cordierite-forming material was blended with water to prepare a moldable material.

This moldable material was charged into an extruder to form a honeycomb green body. After drying by a microwave drier and then by hot wind, the green body was cut at both ends to a predetermined dimension. The green body was then charged into a batch furnace and sintered at 1400° C. for 10 hours, with a temperature-elevating speed of 20° C./hr between 1000° C. and 1200° C., 50° C./hr between 1200° C. and 1350° C., and 10° C./hr between 1350° C. and 1400° C. Thus obtained was a cordierite ceramic honeycomb structure having a diameter of 267 mm, a length of 304 mm, a cell wall thickness of 300 μm and a cell wall pitch of 1.58 mm.

Each cordierite ceramic honeycomb structure was measured with respect to an $Fe_2O_3$ content, an X-ray diffraction intensity ratio of spinel/cordierite, cordierite crystal orientation, $Fe_2O_3$ contents in spinel and cordierite by TEM observation, a spinel particle size, a porosity, and a thermal expansion coefficient. The amount of $Fe_2O_3$ in the cordierite-based ceramic was measured by an ICP atomic emission spectrometer.

A sample cut out of the cordierite ceramic honeycomb structure was pulverized, caused to pass through a sieve having an opening diameter of 1 μm for classification, and subjected to X-ray diffraction measurement using a powder X-ray diffraction apparatus (RINT1500 available from Rigaku), under the conditions of an X-ray source of CuKα1 line, a wavelength λ of 1.540562 Å, a 2θ range of 8°-40°, and a scanning speed of 2°/min. The resultant X-ray diffraction profile was compared with inorganic compound cards registered in the JCPDS file (Powder Diffraction File published by the JCPDS International Center for Diffraction Data), to identify a cordierite crystal and a spinel crystal. The X-ray diffraction intensity ratio of spinel/cordierite was determined by the formula of Isp[220]/Ic[102] (%), wherein Isp[220] was an X-ray diffraction intensity of a [220] plane of spinel, and Ic[102] was an X-ray diffraction intensity of a [102] plane of cordierite in the X-ray diffraction profile.

A test piece cut out of the cordierite ceramic honeycomb structure was subjected to the same X-ray diffraction intensity measurement (cell wall surfaces irradiated with X-ray) as above, and the orientation I of the cordierite crystal was determined by the formula of I=Ic[110]/{Ic[110]+Ic[002]}, in which Ic[110] was an X-ray diffraction intensity of a [110] plane of cordierite, and Ic[002] was an X-ray diffraction intensity of a [002] plane of cordierite in the resultant X-ray diffraction profile.

Using a focus ion beam (FIB) instrument (FB-2000A available from Hitachi, Ltd.), a thin test piece having a thickness of 100 nm was produced from the cordierite ceramic honeycomb structure by a micro-sampling method, and a photograph (10,000 times) of an Z-contrast image was taken in a field having cordierite and spinel using a transmission electron microscope (TEM, HF-2100 available from Hitachi, Ltd.). The maximum diameter A and a diameter B perpendicular thereto were measured on the Z-contrast image photograph using an image analyzer, and a biaxial average particle size R (=(A+B)/2), an arithmetic average of the maximum diameter A and the perpendicular diameter B, was determined as a particle size of spinel. The percentage of the number (n) of spinel particles having particle sizes of 0.01-5 μm to the number (N) of all spinel particles observed was calculated by n/N×100(%). By composition analysis by EDX (energy-dispersive X-ray spectrometer) in a micro-region, the compositions of spinel and cordierite were measured to determine the amount of $Fe_2O_3$ contained in each of spinel and cordierite.

Using a compression load/differential expansion-type thermomechanical analyzer (Thermoplus available from Rigaku), a test piece cut out of the cordierite ceramic honeycomb structure was measured with respect to a thermal expansion coefficient at a constant load of 20 g and a temperature-elevating speed of 10° C./min., to determine an average thermal expansion coefficient in a temperature range of 35-800° C.

TABLE 2

| Cordierite Components | Average Particle Size (μm) | Particle Size Distribution (% by mass) | | | | | | $Fe_2O_3$ (% by mass) |
|---|---|---|---|---|---|---|---|---|
| | | ≧75 μm | ≧45 μm | ≧20 μm | ≧10 μm | ≧5 μm | ≧2 μm | |
| Kaolin | 3 | 0 | 0 | 0.5 | 6 | 25 | 65 | 0.4 |
| Talc | 13 | 2.3 | 8.9 | 33.9 | 56.7 | 75.6 | 95.6 | 1.4 |
| Fused Silica | 15 | 2.2 | 13.6 | 40.7 | 58.6 | 74.6 | 97.4 | 0.01 |

TABLE 3

| Cordierite Components | Average Particle Size (μm) | $Fe_2O_3$ (% by mass) |
|---|---|---|
| Alumina | 5.8 | 0.2 |
| Aluminum Hydroxide | 1.8 | 0.01 |

Examples 17 and 18

The cordierite ceramic honeycomb structures of Examples 17 and 18 were produced in the same manner as in Examples 14 and 15, except that 10 parts by mass of foamed hollow resin particles were added as a pore-forming agent.

Examples 19-23

Comparative Example 9

The cordierite ceramic honeycomb structures of Examples 19-23 were produced in the same manner as in Example 15, except that the sintering time at 1400° C. was changed to 5 hours (Example 19), 15 hours (Example 20), 20 hours (Example 21), 25 hours (Example 22), and 35 hours (Example 23), respectively. The ceramic honeycomb structure of Comparative Example 9 was produced in the same manner as in Examples 19-23, except that sintering was conducted at 1400° C. for 2 hours with a composition of 47.8% by mass of $SiO_2$, 34.7% by mass of $Al_2O_3$ and 14.8% by mass of MgO.

Example 24

Kaolin, talc, fused silica, alumina and aluminum hydroxide each having an average particle size, a particle size distribution and an $Fe_2O_3$ content shown in Tables 2 and 3 were mixed to obtain a cordierite-forming material having a composition comprising 50.0% by mass of $SiO_2$, 35.7% by mass of $Al_2O_3$, and 14.3% by mass of MgO. 100 parts by mass of this cordierite-forming material was mixed with 12 parts by mass of foamed hollow resin particles, 5 parts by mass of methylcellulose, and 2 parts by mass of hydroxypropyl methylcellulose. The resultant mixture was blended with water to form a moldable material. This moldable material had a storage elastic modulus of $2 \times 10^5$ Pa and a complex viscosity coefficient of $5 \times 10^5$ Pa·s.

This moldable material was extruded to provide a green body in the form of a honeycomb. The green body was dried by a microwave drier and then by hot wind, and cut at both ends to a predetermined dimension. The green body was then charged into a batch furnace, sintered at 1400° C. for 10 hours with a temperature-elevating speed of 20° C./hr between 1000° C. and 1200° C., 50° C./hr between 1200° C. and 1350° C., and 10° C./hr between 1350° C. and 1400° C., and cooled with a cooling speed of 30° C./hr between 1400° C. and 1300° C. to obtain a cordierite ceramic honeycomb structure having a diameter of 267 mm, a length of 304 mm, a cell wall thickness of 300 μm, and a cell wall pitch of 1.58 mm. The flow path ends of the ceramic honeycomb structure were alternately plugged in the same manner as in Example 1 to obtain a cordierite honeycomb filter.

TABLE 4

| | Composition of Cordierite Material (% by mass) | | |
|---|---|---|---|
| No. | $SiO_2$ | $Al_2O_3$ | MgO |
| Example 13 | 50.0 | 35.7 | 14.3 |
| Example 14 | 49.6 | 36.0 | 14.4 |
| Example 15 | 49.3 | 36.2 | 14.5 |
| Example 16 | 48.4 | 36.9 | 14.7 |
| Example 17 | 49.6 | 36.0 | 14.4 |
| Example 18 | 49.3 | 36.2 | 14.5 |
| Example 19 | 49.3 | 36.2 | 14.5 |
| Example 20 | 49.3 | 36.2 | 14.5 |
| Example 21 | 49.3 | 36.2 | 14.5 |
| Example 22 | 49.3 | 36.2 | 14.5 |
| Example 23 | 49.3 | 36.2 | 14.5 |
| Example 24 | 50.0 | 35.7 | 14.3 |
| Comparative Example 7 | 51.4 | 34.9 | 13.7 |
| Comparative Example 8 | 47.6 | 37.5 | 14.9 |
| Comparative Example 9 | 47.8 | 37.4 | 14.8 |

The test results in Examples 13-24 and Comparative Examples 7-9 are shown in Table 5. As is clear from Table 5, the ceramic honeycomb structures of Examples 13-24 had as low thermal expansion coefficients as $12 \times 10^{-7}/°$ C. or less, because they were made of cordierite-based ceramics comprising 0.62-0.71% by mass of Fe (calculated as $Fe_2O_3$) and containing spinel in an amount of 0.6-3.7% by an X-ray diffraction intensity ratio, most of the spinel having particle sizes of 0.01-5 μm, and a ratio of (concentration of $Fe_2O_3$ in spinel)/(concentration of $Fe_2O_3$ in cordierite) being 1.1 or more. The ceramic honeycomb structures of Examples 13-18, 20-22 and 24 had as lower thermal expansion coefficients as $10 \times 10^{-7}/°$ C. or less, because the concentration of Fe contained in spinel was in a range of 0.1-10% by mass (calculated as $Fe_2O_3$). Particularly, the ceramic honeycomb structures of Examples 13, 14, 17, 20 and 24 had as low thermal expansion coefficients as less than $6 \times 10^{-7}/°$ C., because the percentage by number of spinel particles having particle sizes of 5 μm or less was 80% or more.

On the other hand, the cordierite ceramic honeycomb structure of Comparative Example 7 had as high a thermal expansion coefficient as more than $12 \times 10^{-7}/°$ C. because of no spinel. The cordierite ceramic honeycomb structure of Comparative Example 8 had as high a thermal expansion coefficient as more than $12 \times 10^{-7}/°$ C., because the X-ray diffraction intensity ratio of spinel/cordierite was more than 4%. The cordierite ceramic honeycomb structure of Comparative Example 9 had as high thermal expansion coefficient as more than $12 \times 10^{-7}/°$ C., because the ratio of (concentration of $Fe_2O_3$ in spinel)/(concentration of $Fe_2O_3$ in cordierite) was less than 1.1.

The cordierite ceramic honeycomb structure of Example 24 had a porosity of 64%, a pore area ratio Sa of 21%, an average pore diameter Da of 15 μm and Lb/La of 1.2, and exhibited such filter characteristics of an "excellent" particulate-matter-capturing ratio, a "good" pressure loss, and an "excellent" isostatic strength, resulting in "good" overall evaluation, because its moldable material had a storage elastic modulus of $2 \times 10^5$ Pa and a complex viscosity coefficient of $5 \times 10^5$ Pa·s. This cordierite ceramic honeycomb structure also had as low a thermal expansion coefficient as $5.9 \times 10^{-7}/°$ C., because the ceramic contained 0.61% by mass of Fe (calculated as $Fe_2O_3$) and had spinel in an amount of 0.6% by an X-ray diffraction intensity ratio, most of the spinel having particle sizes within a range of 0.01-5 μm, and the ratio of (concentration of $Fe_2O_3$ in spinel)/(concentration of $Fe_2O_3$ in cordierite) being 4.5.

TABLE 5

| | X-Ray Diffraction | | | Properties of Ceramic Honeycomb Structure | |
|---|---|---|---|---|---|
| No. | $Fe_2O_3^{(1)}$ (% by mass) | Spinel/Cordierite Ratio[2] (%) | Orientation of Cordierite[3] | Porosity (%) | Thermal Expansion Coefficient ($\times 10^{-7}/°$ C.) |
| Example 13 | 0.61 | 0.6 | 0.51 | 65 | 5.9 |
| Example 14 | 0.64 | 1.4 | 0.55 | 65 | 5.5 |
| Example 15 | 0.65 | 2.1 | 0.53 | 65 | 9.8 |
| Example 16 | 0.66 | 3.7 | 0.52 | 65 | 9.9 |
| Example 17 | 0.63 | 1.4 | 0.46 | 62 | 5.2 |
| Example 18 | 0.65 | 2.1 | 0.47 | 62 | 8.9 |
| Example 19 | 0.68 | 2.0 | 0.47 | 62 | 11.5 |
| Example 20 | 0.68 | 2.1 | 0.48 | 62 | 9.1 |
| Example 21 | 0.68 | 2.1 | 0.48 | 62 | 5.5 |
| Example 22 | 0.65 | 2.0 | 0.47 | 62 | 7.5 |
| Example 23 | 0.66 | 2.2 | 0.48 | 62 | 10.3 |
| Example 24 | 0.61 | 0.6 | 0.51 | 65 | 5.9 |
| Comparative Example 7 | 0.65 | 0.0 | 0.55 | 65 | 13.5 |
| Comparative Example 8 | 0.67 | 4.8 | 0.52 | 65 | 12.3 |
| Comparative Example 9 | 0.67 | 4.2 | 0.53 | 62 | 13.8 |

Note:
[1] The amount of $Fe_2O_3$ in the ceramic.
[2] The spinel/cordierite ratio was a ratio of an X-ray diffraction intensity Isp[220] of a [220] plane of spinel to an X-ray diffraction intensity Ic[102] of a [102] plane of cordierite.
[3] The orientation of cordierite was determined by Ic[110]/(Ic[110] + Ic[002]), wherein Ic[110] was an X-ray diffraction intensity of a [110] plane of cordierite, and Ic[002] was an X-ray diffraction intensity of a [002] plane of cordierite.

| | TEM Observation | | | | | |
|---|---|---|---|---|---|---|
| | Spinel | | | Cordierite | | |
| | $Fe_2O_3$ | Spinel of 0.01-5 μm | | $Fe_2O_3$ | Ratio in $Fe_2O_3$ | |
| No. | (% by mass) | Presence | Number (%) | (% by mass) | Concentration of Spinel/Cordierite[4] | Evaluation[5] |
| Example 13 | 2.7 | Yes | 80.0 | 0.60 | 4.5 | Excellent |
| Example 14 | 3.1 | Yes | 95.0 | 0.60 | 5.2 | Excellent |
| Example 15 | 2.9 | Yes | 55.0 | 0.60 | 4.8 | Good |
| Example 16 | 2.8 | Yes | 55.0 | 0.55 | 5.1 | Good |
| Example 17 | 2.7 | Yes | 90.0 | 0.60 | 4.5 | Excellent |
| Example 18 | 2.9 | Yes | 55.0 | 0.60 | 4.8 | Good |
| Example 19 | 0.8 | Yes | 60.0 | 0.70 | 1.1 | Fair |
| Example 20 | 1.8 | Yes | 60.0 | 0.60 | 3.0 | Good |
| Example 21 | 6.5 | Yes | 85.0 | 0.56 | 11.6 | Excellent |
| Example 22 | 7.2 | Yes | 75.0 | 0.52 | 13.8 | Good |
| Example 23 | 10.2 | Yes | 65.0 | 0.45 | 22.7 | Fair |
| Example 24 | 2.7 | Yes | 80.0 | 0.60 | 4.5 | Excellent |
| Comparative Example 7 | No spinel observed | | | 0.65 | — | poor |
| Comparative Example 8 | 2.5 | Yes | 65.0 | 0.58 | 4.31 | Poor |
| Comparative Example 9 | 0.5 | Yes | 50.0 | 0.68 | 0.74 | Poor |

Note:
[4] Ratio of (concentration of $Fe_2O_3$ in spinel)/(concentration of $Fe_2O_3$ in cordierite).
[5] Evaluated by the following standards:
Excellent: Thermal expansion coefficient was less than $6 \times 10^{-7}/°$ C.,
Good: Thermal expansion coefficient was $6 \times 10^{-7}/°$ C. or more and less than $1 \times 10^{-6}/°$ C.,
Fair: Thermal expansion coefficient was $1 \times 10^{-6}/°$ C. or more and less than $1.2 \times 10^{-6}/°$ C.,
Poor: Thermal expansion coefficient was $1.2 \times 10^{-6}/°$ C. or more.

Figure 3:
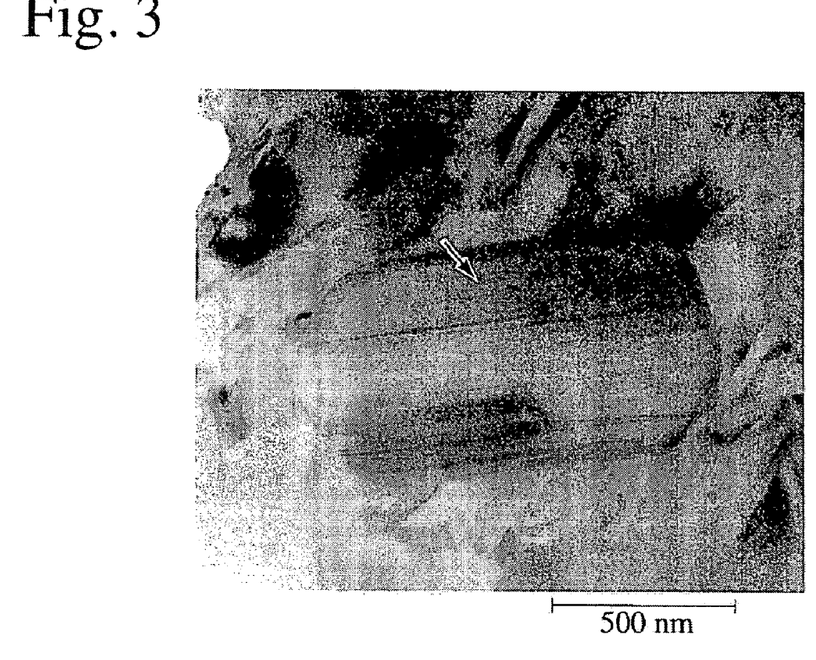
FIG. 3 is a TEM photograph showing the microstructure of the cordierite ceramic honeycomb structure of the present invention.
Figure 4:
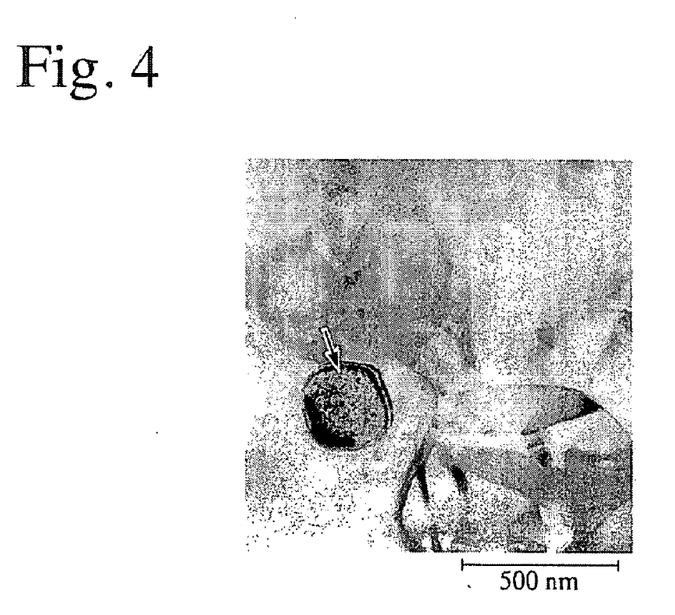
FIG. 4 is a TEM photograph showing the microstructure of the cordierite ceramic honeycomb structure of the present invention.

FIGS. 3 and 4 are TEM photographs showing the cordierite ceramic honeycomb structures of Examples 13 and 14. In the figures, particle portions shown by the arrows were spinel.

EFFECT OF THE INVENTION

Because the ceramic honeycomb structure of the present invention had so-called ink-bottle-shaped pores having an average opening length La and an average internal width Lb meeting the condition of 1.1<Lb/La<5, the pore diameter being as small as 5-30 μm and the pore area ratio being within a range of 10-30% on cell wall surfaces, it exhibits a high particulate-matter-capturing ratio even at the time of starting a diesel engine and immediately after the regeneration of the filter, etc., and also has low pressure loss even though a large amount of particulate matter is accumulated. In addition, because Fe, an inevitable impurity, is concentrated in fine spinel despite as large porosity as 55-75%, the ceramic honeycomb structure of the present invention comprises cordierite having a low Fe concentration, thereby exhibiting a low thermal expansion coefficient and excellent thermal shock resistance.

What is claimed is:

1. A ceramic honeycomb structure having large numbers of flow paths partitioned by porous cell walls, said cell walls having a porosity of 55-75%, said cell walls having an average pore diameter Da of 5-30 μm and a pore area ratio Sa of 10-30% on their surfaces, and the average length La of said pores at their openings and the average width Lb of said pores at depth La from the surfaces of said cell walls meeting the condition of 1.1<Lb/La<5 in an arbitrary vertical cut surface of said cell walls, wherein said ceramic honeycomb structure is formed by a cordierite-based ceramic containing Fe and a spinel, the content of said spinel being 4% or less by an X-ray diffraction intensity ratio, and where the particle size of said spinel is substantially 0.01-5 μm.

2. The ceramic honeycomb structure according to claim 1, wherein said cell walls have a porosity of 58-70%.

3. The ceramic honeycomb structure according to claim 1, wherein a catalyst is supported on said cell walls.

4. The ceramic honeycomb structure according to claim 1, wherein said ceramic honeycomb structure is extruded using a moldable material with plasticity comprising ceramic material powder having an average particle size of 40 μm or less, foamed hollow resin particles having an average particle size of 40-100 μm, a binder, water, and a molding aid, as required, said moldable material having a storage elastic modulus of $5 \times 10^4$ Pa to $1.4 \times 10^6$ Pa and a complex viscosity coefficient of $1 \times 10^4$ Pa·s to $1 \times 10^7$ Pa·s when measured in a viscoelasticity test at a frequency of 1 rad/s.

5. The ceramic honeycomb structure according to claim 1, wherein said spinel has a particle size distribution that 80% or more of said spinel is in a range of 0.01-5 μm.

6. The ceramic honeycomb structure according to claim 1, wherein a ratio of the concentration of Fe in said spinel to the concentration of Fe in said cordierite being 1.1 or more (calculated as $Fe_2O_3$).

7. The ceramic honeycomb structure according to claim 1, wherein the concentration of Fe in said spinel is 0.1-10% by mass (calculated as $Fe_2O_3$).

8. A ceramic honeycomb structure having large numbers of flow paths partitioned by porous cell walls, said cell walls having a porosity of 55-75%, said cell walls having an average pore diameter Da of 5-30 μm and a pore area ratio Sa of 10-30% on their surfaces, and the average length La of said pores at their openings and the average width Lb of said pores at depth La from the surfaces of said cell walls meeting the condition of 1.1<Lb/La<5 in an arbitrary vertical cut surface of said cell walls, wherein said ceramic honeycomb structure is extruded using a moldable material with plasticity comprising ceramic material powder having an average particle size of 40 μm or less, foamed hollow resin particles having an average particle size of 40-100 μm, a binder, water, and a molding aid, as required, said moldable material having a storage elastic modulus of $5 \times 10^4$ Pa to $1.4 \times 10^6$ Pa and a complex viscosity coefficient of $1 \times 10^4$ Pa·s to $1 \times 10^7$ Pa·s when measured in a viscoelasticity test at a frequency of 1 rad/s.

* * * * *